(No Model.)
F. EGNER.
PROTECTOR FOR PIPES FROM POWERFUL ELECTRIC CURRENTS.
No. 505,822. Patented Oct. 3, 1893.
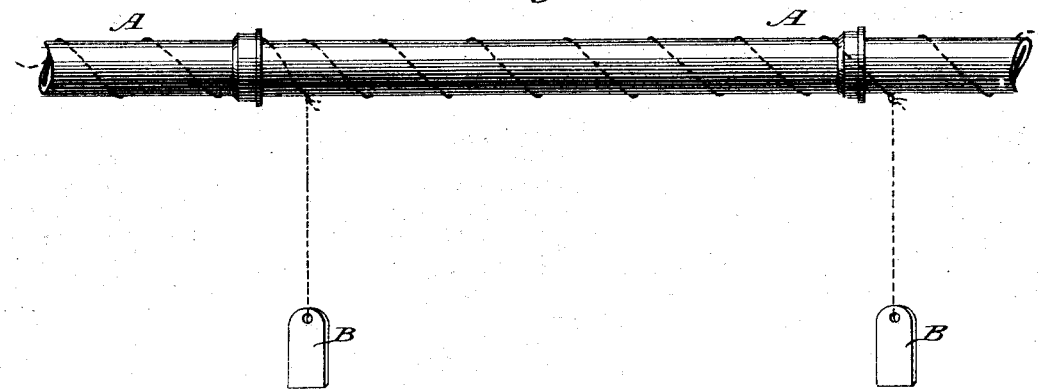
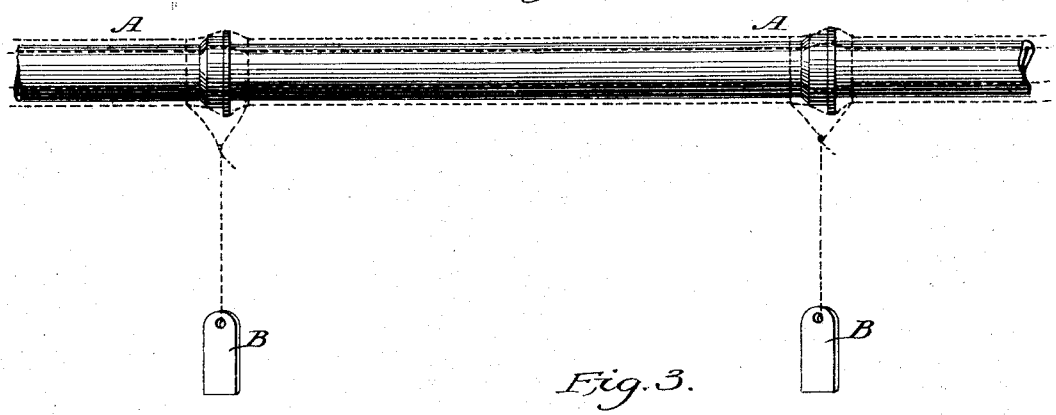
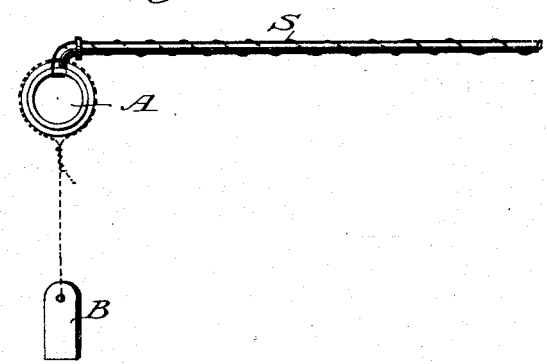
Witnesses.
J. M. Williams
F. J. Casey
Inventor.
Frederic Egner.

UNITED STATES PATENT OFFICE.

FREDERIC EGNER, OF ST. LOUIS, MISSOURI.

PROTECTOR FOR PIPES FROM POWERFUL ELECTRIC CURRENTS.

SPECIFICATION forming part of Letters Patent No. 505,822, dated October 3, 1893.

Application filed June 17, 1893. Serial No. 477,996. (No model.)

*To all whom it may concern:*

Be it known that I, FREDERIC EGNER, a citizen of the United States of America, residing at St. Louis, in the State of Missouri, have invented certain new and useful Improvements for the Protection of Gas and Water Pipes from Powerful Electric Currents, of which the following is a specification.

It has been discovered that the powerful electric currents employed to drive the dynamos of street railways have a decidedly injurious effect upon the service pipes and mains used for distributing gas and water, causing serious and often dangerous leaks; and it has been discovered that quite newly put down pipes have been thus affected, and that serious accidents have resulted therefrom. Various expensive methods have been suggested and some have been tried, to protect the pipes from the action of these currents, but the following is found to be a cheap and reliable preventative.

Reference being now made to the accompanying drawings, Figure 1, is a side elevation of main pipe, such as is ordinarily used for the distribution of gas and water; also showing the application of my invention in one form. Fig. 2, is a similar section of main pipe, showing the application of my invention in another form. Fig. 3, is an end elevation of same pipe, also showing a service pipe connected to said main and my invention.

A wire of copper is wound around the pipes to be protected in a continuous manner; and at distances of one hundred feet more or less, copper plates are buried somewhat deeper than the pipe to be protected, and connected with the wire upon the pipe with wire somewhat heavier than that upon said pipe. Stray currents from electric installations or plants of electric power works, which ordinarily find and injure gas and water mains and service pipes, are thus collected and conducted away without injury to the latter.

Instead of copper wire, any other metal which is a superior conductor of electricity, than is iron or lead, from which these pipes are usually constructed, will answer.

In the drawings the wire has been indicated by dotted lines throughout, in order that same might be distinguished more easily, and the method understood.

The letters of reference indicate as follows: A, A, A, the main pipe; B, B, B, B, B, the ground plates previously mentioned; S, a service pipe as usually attached to the mains, and the dotted lines represent the conducting wires.

The method of application is so very simple and easily applied, and effective, that any one could use it with this description of the matter.

Instead of winding the wire around the pipe, as shown in Figs. 1 and 3; the same may be laid alongside of it, though in the case of large mains, more than one wire would have to be used, as shown for instance in Fig. 2; applied to various portions of the circumference of same; but all must be in close contact with the pipe to be protected, and all must be connected to the ground plates as before described.

Having fully described my invention, what I desire to claim and secure by Letters Patent is—

The improved system for protecting gas and water pipes, comprising the combination of wires, of better conducting material than the pipes, laid around or along the same and in close contact therewith, and earth plates of conducting metal, connected therewith at intervals as described.

In testimony whereof I affix my signature in presence of two witnesses.

FREDERIC EGNER.

Witnesses
C. S. CHARLOT,
S. A. GERSHON.